United States Patent [19]
Anfindsen

[11] Patent Number: 5,983,225
[45] Date of Patent: Nov. 9, 1999

[54] PARAMETERIZED LOCK MANAGEMENT SYSTEM AND METHOD FOR CONDITIONAL CONFLICT SERIALIZABILITY OF TRANSACTIONS

[75] Inventor: Ole Jørgen Anfindsen, Enebakk, Norway

[73] Assignee: Telenor AS, Enebakk, Norway

[21] Appl. No.: 09/013,678

[22] Filed: Jan. 26, 1998

[51] Int. Cl.$^6$ .................................................. G06F 12/00
[52] U.S. Cl. .............................. 707/8; 707/201; 395/726; 711/150; 711/168; 711/210
[58] Field of Search ..................... 707/8, 201; 395/726; 711/150, 151, 210, 163, 168, 152

[56] References Cited

U.S. PATENT DOCUMENTS

| | | | |
|---|---|---|---|
| 4,574,350 | 3/1986 | Starr | 395/726 |
| 5,319,780 | 6/1994 | Catino et al. | 707/8 |
| 5,408,629 | 4/1995 | Tsuchiya et al. | 711/151 |
| 5,504,899 | 4/1996 | Raz | 707/10 |
| 5,551,046 | 8/1996 | Mohan et al. | 707/8 |
| 5,623,659 | 4/1997 | Shi et al. | 707/8 |
| 5,721,943 | 2/1998 | Johnson | 706/59 |
| 5,742,813 | 4/1998 | Kavanagh et al. | 707/8 |
| 5,892,954 | 4/1999 | Tomas et al. | 711/106 |

OTHER PUBLICATIONS

Srivastava et al., "Conditional transactions: a model of computation for active databases", Proceedings of the Fifteenth Annual International Computer Software and Application Conference, IEEE Comput. Soc. Press, Abstract only, 1991.
Anfindsen, "Conditional Conflict serializability and application–oriented correctness criterion", Journal of Database Management, vol. 9, No. 4, Abstract Only, 1998.
Anfindsen, "Parametrized access modes in apotram", Telektronikk, vol. 91, No. 4, Abstract Only, 1995.
Anfindsen et al., "Isolation levels in relational database management systems", Telektronikk, vol. 90, No. 4, Abstract only, 1994.
Raschid, et al., "A simulation–based study on the concurrent execution of rules in a database environment", Journal of Parallel and Distributed Computing, vol. 20, No. 1, Abstract Only, Jan. 1994.

(List continued on next page.)

Primary Examiner—Jean R. Homere
Attorney, Agent, or Firm—Pennie & Edmonds LLP

[57] ABSTRACT

A database management system (DBMS) is modified to provide improved concurrent usage of database objects, particularly when the system is executing long lived transactions. A subset of the transactions access database objects using parameterized read and parameterized write access modes. Each transaction using a parameterized write mode of access for a database object specifies a write access mode, and a write access mode parameter, where the parameter indicates a data reliability classification. Each transaction using a parameterized read mode of access for a database object specifies a read access mode, and a read access mode parameter, where the parameter indicates one or more reliability classifications that are acceptable to the transaction. Whenever a transaction requests access to a specified database object, the DBMS generates a corresponding lock request for the object. If the lock request is a parameterized lock request, a corresponding parameterized lock request is generated. A lock manager processes each lock request by checking to see if any outstanding, previously granted lock is unconditionally conflicting or conditionally conflicting with the requested lock. Two lock requests are unconditionally conflicting if their resource range overlaps and the access modes of the two requests are incompatible. Two requests are conditionally conflicting if analysis of their read/write parameters is necessary to determine whether a conflict exists. A conditional conflict is resolved by determining whether the write parameters for the write lock in question are a subset of the read parameters for the read lock in question.

9 Claims, 4 Drawing Sheets

OTHER PUBLICATIONS

Daynés, Laurent, et al.; "Locking in OODBMS Client Supporting Nested Transactions", *ICDE* (Mar. 1995), pp. 1–8.

Kirsche, Thomas, et al.; "Cooperative Problem Solving using Database Conversations", *IEEE* (1994), pp. 134–143.

Garcia–Molina, Hector; "Using Semantic Knowledge for Transaction Processing in a Distributed Database", *ACM Transactions on Database Systems*, vol. 8, No. 2 (Jun. 1983), pp. 186–213.

Lynch, Nancy A.; "Multilevel Atomicity—A New Correctness Criterion for Database Concurrency Control", *ACM Transactions on Database Systems*, vol. 8, No. 4 (Dec. 1983), pp. 484–502.

Farrag, Abdel, A., et al.; "Using Semantic Knowledge of Transactions to Increase Concurrency", *ACM Transactions on Database Systems*, vol. 14, No. 4 (Dec. 1989), pp. 503–525.

Korth, Henry F., et al; "Formal Aspects of Concurrency Control in Long–Duration Transaction Systems Using the NT/PV Model", *ACM Transactions on Database Systems*, vol. 19, No. 3 (Sep. 1994), pp. 492–535.

Agrawal, Divyakant, et al.; "Consistency and Orderability: Semantics–Based Correctness Criteria for Databases", *ACM Transactions on Database Systems*, vol. 18, No. 3 (Sep. 1993), pp. 460–486.

PARAMETERIZED LOCK MANAGEMENT SYSTEM AND METHOD FOR CONDITIONAL CONFLICT SERIALIZABILITY OF TRANSACTIONS

The present invention relates generally to database management systems and transaction processing systems that utilize a lock manager for protecting database resources from simultaneous incompatible uses, and more particularly to a lock manager that allows greater concurrent use of resources than the lock managers in traditional transaction processing systems while diminishing the "ACID" properties of transactions only with respect to isolation between concurrent transactions.

BACKGROUND OF THE INVENTION

The present invention is directed at the management of transactions in database management systems so as to enable greater concurrency, and therefore more efficient transaction execution, than is allowed by DBMS's requiring strict adherence to the traditional "ACID" properties of transactions. More specifically, the present invention is directed at solving the "serializability" problems introduced by long lived transactions (LLT's). In addition to DBMS's and transaction processing monitors, the present invention may also be used in persistent programming languages as well as to concurrency control services for object resource brokerage systems. For simplicity, the present invention will be described with respect to DBMS's.

The idea of revising or redefining the ACID properties of transactions to enable more efficient execution of transactions in systems that support LLT's is not new. However, the present invention provides a new methodology of "parameterized lock management" that is relatively simple to implement and that allows applications to explicitly control the degree to which they can tolerate diminished isolation between concurrent transactions.

THE TRADITIONAL TRANSACTION ACID PROPERTIES

Traditional database management systems (DBMS's) were developed to support short, atomic transactions, such as for banking and airline reservation applications. Standard transaction management uses flat transactions that adhere to the ACID properties. ACID stands for Atomicity, Consistency, Isolation and Durability.

Atomicity means that either the results of the transaction (i.e., changes to the database) are all properly reflected in the database, or none of them are. Generally, a transaction is said to commit or abort. When a transaction commits, all changes made to the database by the transaction are durably stored, leaving the database in a consistent state. When a transaction aborts, any changes made to the database by the transaction are backed out, once again leaving the database in a consistent state.

Consistency means that each transaction commits only legal results to the database. Thus, a transaction must bring the database from one consistent state to another consistent state.

Isolation means that the events within a transaction must be hidden from other transactions running concurrently. Concurrent transactions must not interfere with each other. They execute as if they had the database to themselves.

Durability means that once a transaction has been completed and has committed its results to the database, the system must guarantee that these results survive any subsequent malfunctions.

The concept of atomicity for transactions is sometimes overloaded with additional meaning. In particular, sometimes atomicity is defined to mean "concurrency atomicity," meaning that no transaction can observe any partial results of an atomic transaction. This document and the present invention, however, take the opposite approach. In particular, in this document atomicity is defined to mean that a transaction's commitment must be atomic. That is, once some work is committed to the DBMS (as opposed to committed to the parent of a subtransaction), the transaction in question cannot continue to perform work that may or may not be committed at some later point in time. This notion of atomicity excludes such things as open nested transactions, but does not exclude partial rollbacks, the use of persistent savepoints, or other mechanisms that can be used by application programmers to control the behavior of the system's recovery mechanisms, since the final outcome of the transaction is still abort or commit.

Failure atomicity implies that all effects of incomplete transactions must be undone in the case of failure. Failure atomicity may be undesirable for long lasting transactions (LLT's). For example, a designer who experiences a power failure just as he is about to commit a week's worth of work is unlikely to consider failure atomicity to be a valuable property of the design database. The obvious solution for this situation (as well as many other LLT's) is for LLT's to have persistent savepoints, which would make it possible to recover an incomplete transaction to the last savepoint taken before a crash. It is noted that removing failure atomicity does not require removing commitment atomicity.

The atomicity and durability properties of transactions are required for system failure recovery, the isolation property is required for concurrency control, and the consistency property is needed for both failure recovery and concurrency control.

It is well known that the ACID properties are well suited for virtually all kinds of short duration transactions. LLT's seem to be the only class of transactions where the ACID properties cause significant problems. LLT's can be complex queries that last for minutes or hours, data mining queries that last for hours or days, or concurrent engineering transactions, controlled by humans and lasting from minutes to months. Full application of the ACID properties in a DBMS that supports LLT's can effectively prevent multiple users from simultaneously using the system. Long term locking of system resources by an LLT can prevent other users or transactions from being able to perform useful work.

It is a premise of the present invention that three of the ACID properties remain highly desirable for LLT's:

Keeping commitment atomicity for LLT's is universally acknowledged as being desirable. Just like short duration transactions, LLT's should have only two possible outcomes: commit all work or abort all work (but see comments above regarding failure atomicity). Therefore, retaining commitment atomicity is desirable.

Inconsistencies in a database are undesirable, although some kinds of inconsistencies may have to be tolerated when dealing with LLT's. Maintaining consistency is desirable, even for LLT's.

Whether or not a transaction lasts a long time before it commits, durability for a committed transaction is always desirable.

It is a premise of the present invention that isolation is the only ACID property that it is desirable to compromise so as to reduce the impact of LLT's on system performance. More specifically, it would be desirable to compromise isolation in a controlled manner so as to give rise to as little inconsistency in the database as possible.

It is a primary object of the present invention to provide a lock manager mechanism for providing applications the ability to explicitly control the extent to which concurrent transactions are isolated from each other or share data with each other.

SUMMARY OF THE INVENTION

In summary, the present invention is a database management system (DBMS) that has been modified to provide improved concurrent usage of database objects, particularly when the system is executing long lived transactions. A subset of the transactions access database objects using parameterized read and parameterized write access modes. Each transaction using a parameterized write mode of access for a database object specifies a write access mode and a write access mode parameter, where the write access mode parameter indicates a reliability classification that indicates the reliability of the write locked data. Each transaction using a parameterized read mode of access for a database object specifies a read access mode, and a read access mode parameter, where the read access mode parameter indicates one or more reliability classifications that are acceptable to the transaction. Whenever a transaction requests access to a database object, the DBMS generates a corresponding lock request for the object. If the access request is a parameterized conditional access request, a corresponding parameterized lock request is generated.

A lock manager processes each lock request by checking to see if any previously granted lock is conflicting or potentially conflicting with the requested lock. Two lock requests are unconditionally conflicting if their resource range overlaps and the access modes of the two requests are incompatible. Two requests are conditionally conflicting if analysis of their read/write parameters is necessary to determine whether a conflict exists. If the lock request being processed is unconditionally conflicting with any outstanding, previously granted lock, the lock request is put on a queue of pending requests. If the lock request is not unconditionally conflicting with any outstanding, previously granted locks, but is conditionally conflicting with an outstanding, previously granted lock, the conditional conflict is resolved by determining whether the write parameters for the write lock in question are a subset of the read parameters for the read lock in question. If so, then there is no conflict. If not, then the requested lock is in conflict with the outstanding previously granted lock. In none of the outstanding, previously granted locks is in conflict with the requested lock, the requested lock is granted. Otherwise it is put on a queue of pending lock requests.

Every time a previously granted lock is released, any pending lock requests that overlap with the resource associated with the released lock are reevaluated.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
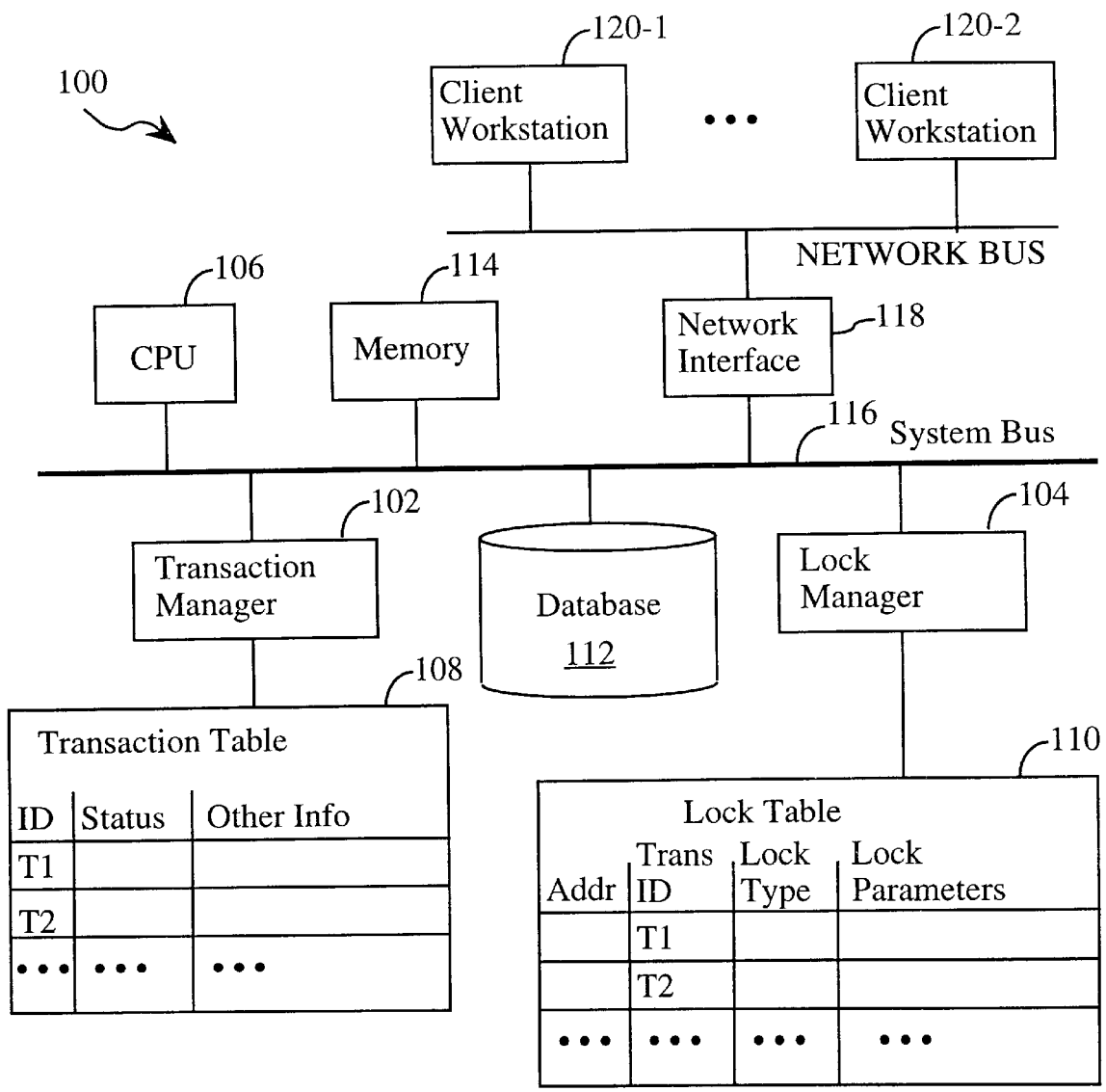
FIG. 1 is a block diagram of a database management system implementing the present invention.

Referring to FIG. 1, there is shown a database management system (DBMS) 100. Transaction operation and management are handled by a transaction manager 102 and a lock manager 104, both of which are software procedures executed by the system's data processor(s) 106. The transaction manager maintains a transaction table 108, sometimes implemented as a tree structure, for keeping track of the identity and status of all pending transactions. The lock manager 104 maintains a lock table 110, usually implemented using a hash table and various linked lists and/or tree structures (which will be discussed in more detail below). The lock table 110 keeps track of all locks that have been requested on resources in a database 112. The database 112 stores all of the data that is accessible to transactions executed by the DBMS 100.

The DBMS 100 will typically also include additional memory resources 114, one or more system busses 116 for interconnecting the various parts of the system, and a network interface 118 or other communications interface for handling communications with client workstations 120.

"Conflicting transactions" are two or more transactions that access the same resource and at least one of them will, at least potentially, update the resource in question. Thus the results generated by at least one of the conflicting transactions may depend on the order in which the transactions are performed.

A "data lock" is a mechanism for assigning a transaction certain rights to a database object, such as a table, a page, or a datum or record in a database table. Thus a first transaction may lock a particular object so as to ensure that no other transaction accesses the data in that data until the first transaction commits or aborts. The prior art includes many types of data locking mechanisms.

"Overlapping resources" are database objects whose address range is the same or at least partially overlapping.

An "access mode" refers to the way in which a transaction or application accesses a data resource. The traditional access modes (browse, read, update, write and exclusive) are described below. When using the parameterized read and write access modes of the present invention, each unique read access parameter value is associated with a distinct read access mode, and each unique write access parameter value is associated with a distinct write access mode.

Lock Table Data Structures Supporting Parameterized Resource Access Requests and Access Modes Referring to FIG. 2, the "lock table" 110 in a preferred embodiment is implemented as follows. A hash function 150 is used to convert a resource identifier into a hash table address in a fixed size hash table 152. The resource identifier that is hashed by function 150 may include a resource type or level indicator (e.g., indicating whether the resource to be locked is a database, table, page or tuple) and the starting address of the resource. Each addressable slot 154 of the hash table includes either a null value if there are no locked resources corresponding to that slot's hash table address, or a pointer to a list of lock control blocks (LCB's) 160 if there is at least one locked resource whose hash value corresponds to that slot's hash table address.

The lock manager will allocate (i.e., generate and store) one lock control block (LCB) 160 for each lockable data item that is actually locked, and will allocate (i.e., generate and store) one lock request block (LRB) 162 for each lock held by a transaction. Thus, if a particular database object is locked by three different transactions at a given point in time, there will be one LCB 160 for that object and a linked list of three LRB's (one per transaction) "hanging" from that LCB.

Each LCB 160 preferably includes:

- a lock ID 170, which will typically include a copy of the resource identifier for a locked resource;
- a mode indicator 171 indicating the most restrictive access mode (e.g., browse, read, parameterized read, write, parameterized write, or exclusive) of all the locks granted on the database resource represented by this LCB;
- a read parameters indicator 172, preferably in the form of a bitmap, representing the logical OR of the read parameters being used by the parameterized read locks (if any) outstanding on the locked resource;
- a write parameters indicator 173, preferably in the form of a bitmap, representing the write parameters of the parameterized write lock (if any) outstanding on the locked resource;
- a granted request list pointer 174 to a list of LRB's 162 for granted (i.e., currently outstanding) resource requests for the database resource represented by this LCB;
- a pending request list pointer 175 to a list (also called a queue) of LRB's 162 for pending (i.e., not yet granted) resource requests represented by this LCB; and
- a next LCB pointer 176 to the next LCB (if any) sharing the same hash address as this LCB.

The read and write parameters represented by fields 172 and 173 in LCB 160 represent an extension by the present invention to the conventional access modes used by DBMS's, and are discussed in more detail below. Each distinct value of a defined set of read/write parameter domain represents a corresponding data reliability classification or category. Thus a parameter domain having eight parameter values (each represented by a corresponding bit of an eight-bit parameter field) would allow for the definition of up to eight different data reliability classifications. In other embodiments of the present invention the parameters may be used to indicate other properties of a database object other than "reliability," such as the type or identity of the application which holds a write lock on the object, or other information that can be used by applications to determine if they are willing to read the data despite the presence of a write lock on it.

Each LRB 162, representing one granted or pending lock request, preferably includes:

- a mode indicator 181, indicating the access mode (e.g., browse, read, parameterized read, write, parameterized write, or exclusive) in which the resource is being accessed or being requested by a particular transaction;
- a transaction identifier 184, which identifies the transaction that requested or holds the lock corresponding to this LRB;
- a parameters indicator 182, preferably in the form of a bit map, representing the read or write access mode parameters (if any) being used by the owner of this read or write lock; this field is used only if the owner of this lock or lock requested is using a parameterized access request;
- a lockset pointer 185 that is used to form a linked list of all the LRB's owned by transaction identified by the transaction ID 184; and
- a Next LRB pointer 186 to the next LRB (if any) for the same database resource as this LRB.

Typical sizes for the read and write parameter fields in the LCB's and the access mode parameter field in the LRB's are one to two bytes, supporting eight to sixteen distinct parameter values.

Figure 3:
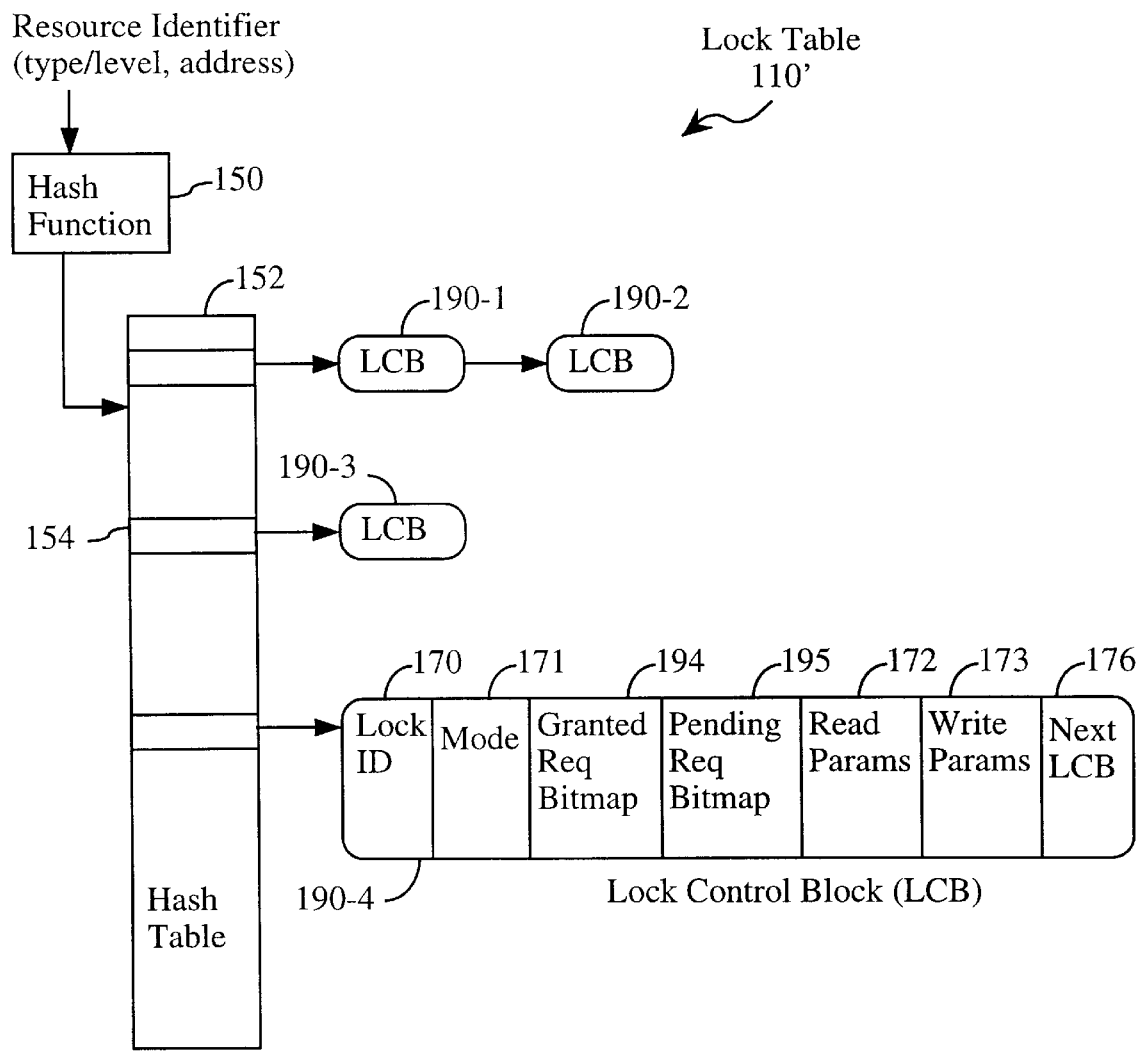
FIG. 3 depicts an alternate set of lock management data structures for keeping track of granted and pending resource lock requests.

FIG. 3 depicts an alternate data structure implementation 110' of the lock table. In this implementation, the lock control blocks (LCB's) 190 each contains a granted request bitmap 194 and a pending request bitmap 195 in place of the granted and pending request list headers 174 and 175. Each of the request bitmaps preferably contains a bitmap of sufficient size (e.g., 64 or 128 bits) to represent the maximum number of concurrent transactions supported by the system. Every active transaction is assigned to one of the bitmapped transaction identifiers. The granted request bitmap 194 contains a set bit for each active transaction that has been granted a lock on the resource represented by the LCB 190. Similarly, the pending request bitmap 195 contains a set bit for each active transaction that has a pending lock request (also called an access request) on the resource represented by the LCB 190.

Figure 2:
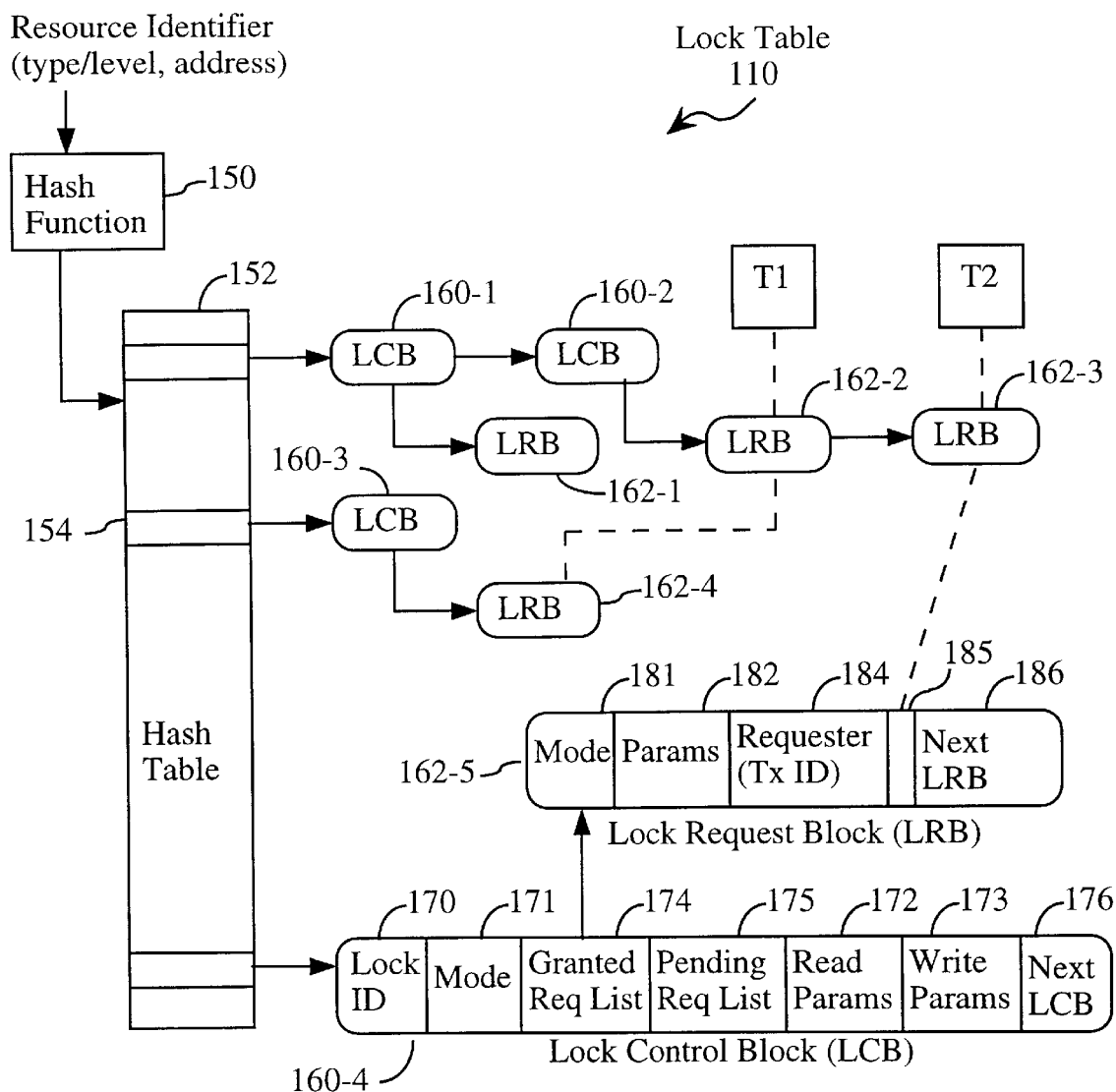
FIG. 2 depicts a set of lock management data structures for keeping track of granted and pending resource lock requests.

The read and write parameter bitmaps 172 and 173, as in the FIG. 2 implementation, represent all the read and write parameterized access modes that have been granted on the database resource represented by the LCB 190.

Whenever a lock request is granted, the read and write parameters in the LCB in question are efficiently updated by logically ANDing the read/write parameters of the granted lock request with the read/write parameter bitmaps previously stored in the LCB. Ideally, when a lock is released, one would like the read and write parameters in the corresponding LCB to be immediately updated. However, this would require ORing the read parameters of all remaining read lock holders (if a read lock is released) and ORing the write parameters of all remaining write lock holders (if a write lock is release). Since this would put an undue delay on transaction commit processing, in a preferred embodiment the lock is released without updating the read and write parameter bitmaps in the LCB. If there are no more lock holders for the resource in question, the read and write parameter bit maps can be cleared, and if there are no pending lock requests, then the LCB can be eliminated altogether. Otherwise, the read and write parameter bitmaps in the LCB are updated with respect to lock releases only when a potential read/write or write/read conflict is detected, in order to figure out whether to grant the requested lock. Alternately, LCB read/write parameter bitmap updating can be handled as a background task, similar to garbage collection.

Serializable Transaction Histories

A transaction history is defined to be serializable if it is equivalent to a serial transaction history. This definition only makes sense if we also define what it means for two histories to be equivalent and what it means for a history to be serial. Equivalence can be defined in more than one way. Two histories are "conflict equivalent" if:

they contain the same transactions and the same operations; and conflicting operations of non-aborted transactions are ordered the same way in both histories.

Two operations are defined to conflict if they do not commute. That is, if the results of executing one before the other is in general not equivalent to executing them in the reverse order. It is common to model transactions as consisting of read and write operations only, and the conflict relation for those two operations is that two operations conflict if at least one of them is a write operation. The basic lock compatibility matrix is:

TABLE 1

|   | R | W |
|---|---|---|
| R | * |   |
| W |   |   | where "*" in Table 1 (as well as in the following tables) indicates non-conflicting operations. Table 1 indicates that two transactions can read the same data item, but a transaction that is performing write operations must have exclusive access to it.

A transaction history H is serial if for every pair of transactions $T_i$ and $T_j$, either all operations of $T_i$ come before all operations of $T_j$ in H, or all operations of $T_j$ come before all operations of $T_i$ in H. In other words, a transaction history is serial if it does not have any concurrency. Each transaction executes to completion before the next one starts. If transactions are atomic, durable and consistent, then a serial transaction history will be correct. It follows that a concurrent execution of transactions that is conflict equivalent to a serial one, must necessarily be correct, too. A transaction history that is conflict equivalent to a serial history is called conflict serializable, and the corresponding correctness criterion is called conflict serializability.

A serialization graph (SG) for a transaction history H is denoted SG(H). This is a directed graph whose nodes are the committed transactions of H, and it has an edge between all pairs of nodes representing transactions that have issued conflicting operations. The direction of the edges are in accordance with the sequence of the conflicting operations. An edge from $T_i$ to $T_j$ in SG(H) means that $T_i$ as issued an operation that conflicts with and precedes some operation issued by $T_j$. Intuitively, if $T_i$ and $T_j$ are involved in a cycle in SG(H), then $T_i$ comes both before and after $T_j$ in H, in which case H cannot be equivalent with any serial history. The fundamental theorem of serializability says that a history H is serializable if and only if its serialization graph SG(H) is acyclic.

To enforce serializability, virtually all commercial DBMS's use some form of data locking. Two phase locking (2PL) operates according to the following rules:

1) a transaction may not perform an operation on a data item unless it holds a lock corresponding to the operation (e.g., a read or write operation) in question on that data item;

2) a lock request from a transaction must be delayed or rejected by the transaction scheduler if another transaction holds a conflicting lock on the data item in question; and 3) a transaction may not acquire a new lock if it has released any of its old ones.

The first two rules prevent transactions from directly interfering with each other. The third rule, called the two phase locking rule, prevents cycles in the serialization graph. The intuitive explanation of the two phase locking rule is as follows. When a transaction acquires a lock, that may establish an incoming edge to its node in the serialization graph. An outgoing edge from a transaction's node in the serialization graph can only be established if that transaction has released a lock. Thus, in order to create a cycle in the serialization graph, some transaction must first release a lock and then later acquire a lock. Since this is prohibited by the two phase locking rule, transaction schedulers that obey the two phase locking rule ensure acyclicity of serialization graph's, and therefore ensure serializable histories.

In addition to serializability, it is important for a transaction management system to maintain a "strict" history by:

avoiding cascading aborts (ACA), in which the failure of a first transaction causes other transactions that depended on the results computed by the first transaction to abort; and ensuring that all data items written by a transaction $T_i$ cannot be overwritten by another transaction until after transaction $T_i$ has aborted or committed.

The solution for maintaining a strict transaction history is to add the restriction that all write locks acquired by a transaction must be held until the transaction commits. A rigorous transaction history is maintained by requiring that all read and write locks acquired by a transaction be held until the transaction commits. With these added restrictions, two phase locking is called "strict two phase locking," or strict 2PL.

A nasty problem with transaction schedulers that use the two phase locking rule is that transactions can get involved in deadlocks. As a consequence of the second locking rule, transactions sometimes have to wait for locks. Such waiting is caused by another transaction holding a conflicting lock, and the waiting transaction cannot make any progress until the other transaction releases its lock. If two transactions are waiting for each other, neither can make progress until the other one releases its lock. As long as neither of them releases its lock, the two transactions are deadlocked. More generally, deadlocks can involve more than two transactions that are waiting for each other in a cyclic way.

Transaction Isolation Levels

While isolation levels (i.e., levels of isolation between transactions) can be defined without reference to any particular implementation technique, the present invention assumes the use of a lock manager for implementing isolation control. Isolation levels supported by commercial systems, ordered from least to most restrictive, include:

UR (uncommitted read). This is also known as read uncommitted, read through, or dirty read. This isolation level allows an application to read both committed and uncommitted data. As a result, the data read by an application (i.e., transaction) may be inconsistent with other data read by the application. Applications using the UR isolation level do not acquire any ordinary read locks, but will typically hold a browse lock at some high level in the resource hierarchy. Applications using the UR isolation level must still use write locks to protect write operations. There are two types of situations where UR isolation is most typically used:

(1) when the application does not need an exact answer, and (2) when the application (i.e., the person who wrote the application) knows that the data to be read is not being updated by anyone else.

CR (committed read). This is also known as read committed. The committed read isolation level allows an application to read only committed data. CR isolation can be implemented using "zero duration" read locks. That is, if an application wants to read a database object, if suffices for the DBMS to check that a read lock could have been granted. If the read lock could have been granted, the object is read, but a read lock is not acquired. CR isolation is much less expensive than cursor stability (CS) isolation (described below) in terms of CPU cycles. Unless an application needs the additional semantics offered by cursor stability isolation (and many applications do not), committed read isolation is the better alternative.

CS (cursor stability). Cursor stability isolation allows an application to read only committed data and guarantees that a row will not change as long as a cursor is positioned to it. CS isolation causes locks to be kept until the cursor moves to the next lockable object. For example, CS isolation is useful for an application that fetches a row from a database table (using a cursor to point to the row) and then performs a database manipulation based on the current row's data values before fetching another row. An application should have at least CS isolation for cursors that are to be used to point to rows of data that are to be updated or deleted by UPDATE or DELETE operations.

RR (repeatable read). RR isolation allows an application to read only committed data and guarantees that read data will not change until the transaction terminates (i.e., a read that is repeated will return the original row, unchanged). RR isolation will not prevent the so-called phantom row phenomenon. That is, when a cursor is reopened, a row not present the previous time may appear. Read locks covering data items retrieved by an application using RR isolation must be kept until the transaction commits or aborts.

TC (transaction consistency). TC isolation is also known as serializable isolation. TC isolation allows an application to read only committed data and guarantees that the transaction has a consistent view of the database, as if no other transactions were active. Transactions using TC isolation may be part of a transaction history that is not serializable where other transactions use lower levels of isolation. On the other hand, if all transactions in a history use TC isolation, that history will be serializable. All read locks acquired by a transaction using TC isolation must be kept until the transaction commits or aborts.

Another isolation level is the QC (query consistency) level. QC isolation allows an application to read only committed data, and guarantees that all data accessed in a single query is consistent. Implementing QC isolation by means of data locking is straightforward: all read locks must be kept until the query is completed (i.e., until the cursor is closed). Since cursors are defined using queries, QC isolation guarantees that all rows in a cursor's answer set are consistent. QC isolation is also valuable when performing statistical analysis, or when comparing or otherwise using together data values from different cursor row occurrences. QC isolation is weaker than RR isolation, but stronger than CS isolation.

Isolation level CS, or weaker, is often not suitable for any query that uses aggregation and for any application that processes a cursor where the answer set must be consistent. While using RR or TC isolation solves this problem, RR and TC actually provide more isolation than is needed for most such applications. The QC isolation level is the lowest isolation that provides the necessary and sufficient isolation for such queries.

Transaction Access Modes

There are two basic access modes: read and write. When a database object is accessed in read mode, the agent in question can perform only read operations on that object. Two or more transactions may access a given object concurrently, provided they all use read mode. When a database object is accessed in write mode, the transaction in question can perform both read and write operations on that object. More specifically, write mode enables reading, deleting, inserting and modifying objects. If an object is accessed in write mode by one transaction, no other transaction can access that object in either read or write mode. In addition to these two basic access modes, many DBMS's support browse, upgrade and exclusive access modes.

Browse mode enables a transaction to read an object even if some other transaction is currently accessing it in write mode. Thus, when using browse mode, transactions have no guarantee of a consistent view of the database, since there is a risk that they will read uncommitted data. The use of browse mode is often denoted as read through mode or dirty read mode, and is used with isolation level UR. Even an application using the UR isolation level needs to inform others of its presence, and it does so by accessing resources in browse mode.

Upgrade mode is similar to read mode, with the added semantics that the transaction in question may at any time request an upgrade to write mode. That is, it may upgrade its access mode. When a first transaction accesses an object in upgrade mode, no other transaction can access the same object in write mode, or upgrade mode, until the first transaction commits or aborts.

Support for upgrade mode was added to DBMS's to prevent single object deadlocks. Some applications work as follows: a number of database objects are "looked at," but only some of these are updated or deleted. If all the objects in question are "looked at," in write mode, the problem is unacceptably low concurrency. The alternative, assuming upgrade mode is not supported, is to "look at" objects in read mode and then promote from read to write mode whenever an update or delete operation is to be performed. The problem with this approach is that two transactions may access the same object in read mode, and if they both request promotion to write mode, the result is deadlock. This dilemma is eliminated by supporting upgrade mode, since upgrade modes are not mutually compatible.

Exclusive mode is used by a transaction to prohibit any other transactions from accessing the same object, irrespective of access mode. Exclusive mode is used when even browsers must be denied access to an object, such as when a table is to removed from a relational database.

The relationship between the five traditional access modes is represented by Table 2, where B represents browse mode, R represents read mode, U represents upgrade mode, W represents write mode and X represents exclusive mode.

TABLE 2

|   | B | R | U | W | X |
|---|---|---|---|---|---|
| B | * | * | * | * |   |
| R | * | * | * |   |   |
| U | * | * |   |   |   |
| W | * |   |   |   |   |
| X |   |   |   |   |   |

Asterisks (*) in Table 2 indicate compatibility. For example, read mode (R) access by a first transaction is compatible with browse (B), read (R) or upgrade (U) mode in a second transaction. Write mode (W) is compatible only with browse mode. Exclusive mode (X) is not compatible with any other access mode.

The five access modes are typically implemented using locks. It should be noted that it is usually necessary to support a number of different lock granularities. Typical lock granularities are tuple (i.e., database table row), object, page, table, class, file, tablespace, and database. Unless it is required that all transactions use the same lock granularity, the DBMS must be able to coordinate concurrent transactions that request locks at different levels in the resource hierarchy. The typical solution is once a transaction requests locks at some resource level, it will not request additional locks on lower levels of the same resource (because other concurrent transactions may acquire other locks on portions of that resource that are compatible with the first lock put on the resource), but it may request locks at higher levels. It is possible for a single transaction to use different lock granularities for different statements, but this is not significant for the discussion at hand.

The following intent locks are needed: intent to request read (LR) locks indicate an intent to request read locks at some lower level, intent to request write (IW) locks indicate an intent to request write locks at some lower level, and RIW, which provides read access to the entire resource in question (e.g., a table) while also enabling the transaction to request update and write locks at some lower level (such as at the page or tuple level). It should be noted that an IW lock on a table enables its holder to request R. U and W locks (not just W locks) on tuples or pages with the table. An IW lock on a resource will be promoted to an RIW lock if the transaction holding the IW lock requests an R lock on the same resource.

Two transactions with overlapping IW locks are considered to be compatible because the potential conflicts will be resolved at some lower level in the resource hierarchy. For example, two transactions may need to update various tuples in a relational table. The both acquire IW locks on that table (and probably also on some higher level resources, such as file or tablespace, as well as the database), and then R, U or W locks on individual tuples. As long as the two transactions do not access the same tuple, then there will no conflict. Should they happen to access the same tuple, then there will be a conflict, and the possibility of deadlock cannot be completely excluded. However, the potential deadlocks caused by overlapping IW requests are, in general, no worse than the potential deadlocks associated with other resource locking situations.

The complete lock (access mode) compatibility matrix is shown in Table 3.

TABLE 3

Compatibility Matrix for Access Modes

|     | B | IR | R | U | IW | RIW | W | X |
|-----|---|----|----|---|----|-----|---|---|
| B   | * | *  | *  | * | *  | *   | * |   |
| IR  | * | *  | *  | * | *  | *   |   |   |
| R   | * | *  | *  | * |    |     |   |   |
| U   | * | *  | *  |   |    |     |   |   |
| IW  | * | *  |    |   | *  |     |   |   |
| RIW | * | *  |    |   |    |     |   |   |
| W   | * |    |    |   |    |     |   |   |
| X   |   |    |    |   |    |     |   |   |

Note that the RIW row/column is identical to the intersection of the R and IW rows/columns. In practice, browse (B) locks and exclusive (X) locks are not used at the lowest resource levels. Using B locks at the lowest levels would, at least partially, defeat the purpose of using isolation level UR in the first place. For example, in a relational DBMS a transaction using the UR isolation level may request a browse lock at the table level (and all levels above the table level), and then proceed without requesting any locks on pages or tuples. Alternately, the transaction may request some sort of low-cost, short duration locks (known as latches) on pages or tuples to ensure atomicity of individual read operations.

Conditional Conflict Serializability

The present invention is based on the premise that serializability is an unsuitable correctness criterion for some types of applications, such as concurrent engineering, typified by CAD and CASE applications. The present invention uses a new correctness criterion, herein called conditional conflict serializability (CCSR) which is a weaker kind of serializability based on a weaker notion of conflict between transactions.

The idea behind CCSR is to depart from a purely commutativity based definition of conflict. While write operations are still considered to be mutually conflicting, write-read and read-write conflicts are made conditional. This is achieved by using "parameterized" read and write modes, and corresponding parameterized read and write locks.

If $R(A)$ and $W(B)$ denote parameterized read and write modes, respectively, where A and B denote subsets of some parameter domain D, $R(A)$ and $W(B)$ are compatible if and only if B is a subset of A: $B \subseteq A$. For example, if the parameter domain D contains modes u1, u2, through u5, $R(u1, u2)$ is compatible with $W(u1)$ because $u1 \subseteq (u1, u2)$.

Recall that two transaction histories are "conflict equivalent" if they contain the same transactions and operations, and conflicting operations of non-aborted transactions are ordered in the same way in both histories. Identical terms can be used to defined conditional conflict equivalence, so long as the parameter subset comparison is used to determine which operations are conflicting. Thus, a transaction history is defined to be "conditional conflict serializable" if and only if it is conditional conflict equivalent to a serial transaction history.

As discussed above, the serializability theorem states that a history H is serializable if and only if its serialization graph is acyclic. A generalized version of this theorem applies to CCSR. A conditional conflict serialization graph (CCSG) is defined in the same way as a regular serialization graph, provided the term "conflicting operations" is understood to mean conditionally conflicting operations. Thus, a transaction history H is conditional conflict serializable (CCSR) if and only if the history's conditional conflict serialization graph (CCSG) is acyclic.

The use of dirty reads does not provide a means for distinguishing between relatively stable database data and database data undergoing major changes. All sorts of inconsistencies can result from dirty reads, and traditional DBMS's do not provide the user with any hints as to what they might be. On the other hand, the parameterized access modes of the present invention make it possible for database users (i.e., typically, application programs) to receive information about the reliability of uncommitted data from the parameters the writer of the data has attached to the write lock on the data. More generally, the parameterized access modes of the present invention (A) enables application programmers to customize the notion of conflict between transactions, and (B) enables applications to communicate to each other the quality of uncommitted data.

The parameter domain D can be user defined, or defined differently in different database systems. The "data model" used can be simple or complex, and thus the number of parameters in domain D can be small or large, depending on the needs of the application programs.

Using the present invention, the standard assumption that read and write modes are mutually incompatible is reduced to a default, which transactions can override by proper use of parameters. Instead, applications or transactions can specify when reading and writing is incompatible. Using the example discussed above in which the parameter domain D contains modes u1, u2, through u5:

R(u1, u2) and W(u1) are compatible,

R(u1) and W(u1) are compatible,

R(u1) and W(u2) are not compatible, and

R(u2) and W(u2, u3) are not compatible.

Non-parameterized read and write modes can still be denoted as R and W, but can be thought of as R($\emptyset$) and W(*), where $\emptyset$ denotes the empty set and * denotes an arbitrary superset of D. Thus, according to the rule that R(A) and W(B) are compatible if and only if $B \subseteq A$, R($\emptyset$) is incompatible with all write modes and W(*) is incompatible with all read modes. Generally, there will be no such thing as a write mode that is compatible with every read mode, but R(D) denotes the read mode that is compatible with every write mode W(B) except W.

When an application uses a parameterized write mode, it is indicating a willingness to share information with readers. That is, a transaction using parameterized writes indicates to other transactions the degree of safety associated with reading data that it has not yet committed. Analogously, the use of parameterized read modes by a transaction indicates willingness to read data that belongs to parameterized writers. The new access mode compatibility matrix, using parameterized access modes, is shown in Table 4. In Table 4, * indicates unconditional compatibility, blank table entries indicate unconditional incompatibility, and formulas such as $B2 \subseteq A1$ and $B1 \subseteq A2$ indicate conditional compatibility.

reliability categories. Each such category is represented by a reliability classification indicator, that is by a parameter in domain D.

Especially for long lived transactions, it may be necessary to allow transactions to update the parameters associated with their write locks over time. For instance, the write locked data may initially be very unreliable (denoted by parameter u1), and then may be progressively upgraded to higher and higher levels of reliability (denoted by parameters, u2, u3, and so on) as the transaction progresses.

Further, in systems having long lived transactions, there may be a need for lock management methods that do not simply block a transaction when incompatible lock modes are encountered. Rather, in at least some situations, parameterized read modes may be treated as a request for data filtering, such that objects that are locked in incompatible write modes are skipped by parameterized reads. In some implementations of the present invention, applications using parameterized read access requests may include an additional filter/wait flag to indicate if the read request is to be serviced by filtering out objects locked in incompatible write modes or is to wait for them to become available.

The "uncommitted dependency problem," the "dirty read" problem and the "temporary update problem" are three names for the same thing: the use of uncommitted data is unreliable because it is subject to further change, due either to transaction abort or further modification by the application. The real problem is that an application can retrieve uncommitted data "assuming" that it is reliable, and then go ahead and do something based on this assumption. Contrary to this, the parameterized access mode method of the present invention explicitly informs applications when uncommitted data is encountered and also delivers information about the reliability of the uncommitted data. The application is free to handle such a situation in whatever way it sees fit: it may continuing as if nothing special happened, it may invoke some special procedure, it may perform a full or partial rollback, or do something else. Since no application will be deceived into believing that uncommitted data can be fully trusted, the uncommitted dependency problem is eliminated when using the present invention.

The incorrect summary problem and the inconsistent analysis problem are two versions of another problem: an

TABLE 4

Conditional Compatibility Matrix for Parameterized Access Modes

|  | B | IR(A1) | R(A1) | U | IW(B1) | R(A1)IW(B1) | W(B1) | X |
|---|---|---|---|---|---|---|---|---|
| B | * | * | * | * | * | * | * |  |
| IR(A2) | * | * | * | * | * | * | $B1 \subseteq A2$ |  |
| R(A2) | * | * | * | * | $B1 \subseteq A2$ | $B1 \subseteq A2$ | $B1 \subseteq A2$ |  |
| U | * | * | * | * |  |  |  |  |
| IW(B2) | * | * | $B2 \subseteq A1$ |  | * | $B2 \subseteq A1$ |  |  |
| R(A2)IW(B2) | * | * | $B2 \subseteq A1$ |  | $B1 \subseteq A2$ | $B1 \subseteq A2$ AND $B2 \subseteq A1$ |  |  |
| W(B2) | * | $B2 \subseteq A1$ | $B2 \subseteq A1$ |  |  |  |  |  |
| X |  |  |  |  |  |  |  |  |

Parameterized lock modes increase the amount of memory used by the lock manager to record each lock, and also increase the amount of computation required to resolve lock requests.

It may be noted that the present invention does not force users (i.e., applications) to quantify uncertainty, but rather allows them to classify it. That is, users can denote unreliable data as belonging to one or more of a predefined set of application may retrieve multiple data items and use them as input to some calculation, such as finding a sum or average, but interference from a concurrent transaction may cause the calculated value to be incorrect. This problem occurs when an updating application involves at least two data items: one that has already been retrieved by the analyzing application and one that has not yet been retrieved. One possible solution to this problem is to use an unparameterized read, which is incompatible with all write modes. However, this solution is undesirable or impossible in some situations.

Another possible solution, applicable only to special cases, is to establish a rule that all updates involving more than one data item should be performed using write mode parameters from a subset S of D. Any reader than needs to perform a consistent data analysis needs to avoid reading data that is write locked by any other transaction using a write mode parameter in subset S.

Another possible solution related to access mode usage is to label data modification as minor, medium and major (or any other set of gradations). Thus a user would have objects locked in W(minor) mode most of the time, but would upgrade to W(medium) or W(major) whenever more significant changes than usual are to be performed, such as shuffling the sequence of data items, deleting and inserting multiple data items, and so on. After the major changes have been made, the user would downgrade the write locks to W(minor). In this way, readers can protect themselves from reading data in the midst of undergoing major changes, while accepting smaller levels of data inconsistency.

Handling Resource Access Requests

Figure 4:
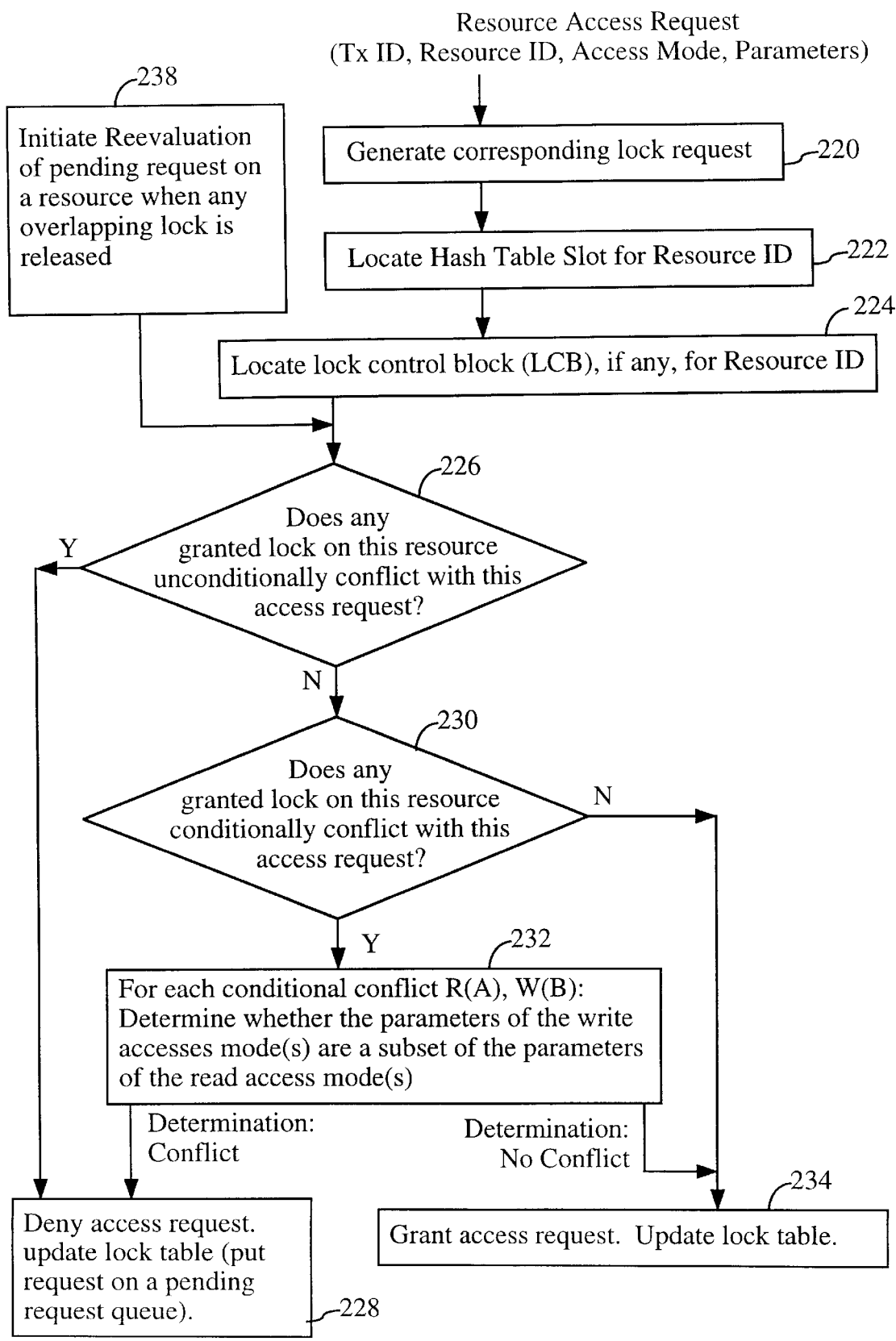
FIG. 4 is a flow chart of the object locking method of the present invention.

Referring to FIG. 4, it can be assumed that in any system utilizing the present invention, a subset of the transactions access database objects using parameterized read and parameterized write access modes, while other transactions used unparameterized access requests. Each transaction using a parameterized write mode of access for a database object specifies a write access mode, and a write access mode parameter, where the write access mode parameter indicates a reliability classification to other transactions that may request read access to the database object. Each transaction using a parameterized read mode of access for a database object specifies a read access mode, and a read access mode parameter, where the read access mode parameter indicates one or more reliability classifications that are acceptable to the transaction. Whenever a transaction requests access to a specified database object, the DBMS generates a corresponding lock request for the object (step 220). If the access request is a parameterized conditional access request, a corresponding parameterized lock request is generated.

The system's lock manager processes each lock request by searching the lock table (steps 222, 224) for any corresponding previously generated locks. Next, it checks to see if any previously granted lock is conflicting or potentially conflicting with the requested lock (steps 226, 230, 232). Two lock requests are unconditionally conflicting if their resource ranges overlap and the access modes of the two requests are incompatible (step 226). For example, the blank positions in Table 4 represent unconditionally conflicting access requests. In terms of the data structures shown in FIGS. 2 and 3, the access mode of the current request is compared with the most restrictive access mode previously granted for each of the overlapping resources for which any locks have been granted. For example, if the current access request is for an upgrade (U) mode or a write (W) mode, and there is already a granted lock for an overlapping resource that has a U or W mode, the current access request is unconditionally conflicting with the previously granted lock. If the lock request being processed is unconditionally conflicting with any outstanding, previously granted lock (step 226), the lock request is put on a queue of pending requests (step 228).

Two requests are conditionally conflicting if analysis of their read/write parameters is necessary to determine whether a conflict exists (step 230). Using the access modes described above, the read/write parameter comparison performed for each pair of potentially conflicting requests are those shown in Table 4 (step 232). That is, the conditional conflict is resolved by determining whether the write parameters for the write lock in question are a subset of the read parameters for the read lock in question. If so, then there is no conflict. If not, then the requested lock is in conflict with the outstanding previously granted lock. If none of the outstanding, previously granted locks is in conflict with the requested lock, the requested lock is granted (step 234). Otherwise it is put on a queue of pending lock requests (step 228). Every time a previously granted lock is released, any pending lock requests that overlap with the resource associated with the released lock are reevaluated (step 238).

Alternate Embodiments

The present invention may be implemented in DBMS's, transaction processing monitors, persistent programming languages, and concurrency control services for object resource brokerage systems. It may be distributed either in the form of such systems, or as a computer program product that is distributed on computer readable media such as magnetic data storage media (i.e., disks or tapes), CDROM, or the like. A computer program product embodiment of the present invention may be distributed electronically, over the Internet or other communications network, as a computer data signal embodied in a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A resource lock management system, comprising:
   a lock data structure storing lock data representing granted and pending resource lock requests, wherein the data representing each granted and pending resource lock request includes: data indicating a resource to which access has been granted or requested, and an access mode associated with the resource lock request;
   wherein a subset of the granted and pending resource lock requests are parameterized resource lock requests and the data representing each resource lock request in the subset further includes one or more parameter values indicating a data reliability classification associated with the resource lock request; and
   a lock manager for evaluating, granting and denying resource lock requests, including determining when a resource lock request is unconditionally conflicting with any granted resource lock request, determining when the resource lock request is conditionally conflicting with any granted resource lock request, and evaluating the resource lock request with respect to each conditionally conflicting granted resource lock request by performing a predefined comparison of the parameter values for the resource lock request with the parameter values for each conditionally conflicting granted resource lock request.

2. The resource lock management system of claim 1, wherein the resource lock request is conditionally conflicting with a granted resource lock request only when (A) both the resource lock request and the granted resource lock request are parameterized resource lock requests and (B) the resource lock request is neither unconditionally conflicting nor unconditionally compatible with the granted resource lock request.

3. The resource lock management system of claim 2, wherein when resource lock request is a parameterized read lock request R(A), where A represents the parameter values for the parameterized read lock request, and the granted resource lock request is a parameterized write lock request W(B), where B represents the parameter values for the parameterized write lock request, the lock manager determines whether the resource lock request is conflicting with the granted resource lock request by determining whether or not B is a subset of A.

4. A resource lock management method, comprising the steps of:

storing lock data representing granted and pending resource lock requests, wherein the data representing each granted and pending resource lock request includes: data indicating a resource to which access has been granted or requested, and an access mode associated with the resource lock request;

wherein a subset of the granted and pending resource lock requests are parameterized resource lock requests and the data representing each resource lock request in the subset further includes one or more parameter values indicating a data reliability classification associated with the resource lock request; and evaluating, granting and denying resource lock requests, including determining when a resource lock request is unconditionally conflicting with any granted resource lock request, determining when the resource lock request is conditionally conflicting with any granted resource lock request, and evaluating the resource lock request with respect to each conditionally conflicting granted resource by performing a predefined comparison of the parameter values for the resource lock request with the parameter values for each conditionally conflicting granted resource lock request.

5. The resource lock management method of claim 4, wherein the resource lock request is conditionally conflicting with a granted resource lock request only when (A) both the resource lock request and the granted resource lock request are parameterized resource lock requests and (B) the resource lock request is neither unconditionally conflicting nor unconditionally compatible with the granted resource lock request.

6. The resource lock management method of claim 5, wherein when resource lock request is a parameterized read lock request R(A), where A represents the parameter values for the parameterized read lock request, and the granted resource lock request is a parameterized write lock request W(B), where B represents the parameter values for the parameterized write lock request, the resource lock request is evaluated with respect to the granted resource lock request by determining whether or not B is a subset of A.

7. A computer program product for use in conjunction with a computer system, the computer program product comprising a computer readable storage medium and a computer program mechanism embedded therein, the computer program mechanism comprising:

instructions for storing lock data representing granted and pending resource lock requests, wherein the data representing each granted and pending resource lock request includes: data indicating a resource to which access has been granted or requested, and an access mode associated with the resource lock request;

wherein a subset of the granted and pending resource lock requests are parameterized resource lock requests and the data representing each resource lock request in the subset further includes one or more parameter values indicating a classification associated with the resource lock request; and lock manager means for evaluating, granting and denying resource lock requests, including determining when a resource lock request is unconditionally conflicting with any granted resource lock request, determining when the resource lock request is conditionally conflicting with any granted resource lock request, and evaluating the resource lock request with respect to each conditionally conflicting granted resource lock request by performing a predefined comparison of the parameter values for the resource lock request with the parameter values for each conditionally conflicting granted resource lock request.

8. The computer program product of claim 7, wherein the resource lock request is conditionally conflicting with a granted resource lock request only when (A) both the resource lock request and the granted resource lock request are parameterized resource lock requests and (B) the resource lock request is neither unconditionally conflicting nor unconditionally compatible with the granted resource lock request.

9. The resource lock management system of claim 8, wherein when resource lock request is a parameterized read lock request R(A), where A represents the parameter values for the parameterized read lock request, and the granted resource lock request is a parameterized write lock request W(B), where B represents the parameter values for the parameterized write lock request, the lock manager determines whether the resource lock request is conflicting with the granted resource lock request by determining whether or not B is a subset of A.

* * * * *